(12) United States Patent
Bahar

(10) Patent No.: US 7,024,696 B1
(45) Date of Patent: Apr. 4, 2006

(54) METHOD AND SYSTEM FOR PREVENTION OF PIRACY OF A GIVEN SOFTWARE APPLICATION VIA A COMMUNICATIONS NETWORK

(76) Inventor: Reuben Bahar, 23708 Welby Way, West Hills, CA (US) 91307

( * ) Notice: Subject to any disclaimer, the term of this patent is extended or adjusted under 35 U.S.C. 154(b) by 764 days.

(21) Appl. No.: 09/594,004

(22) Filed: Jun. 14, 2000

(51) Int. Cl.
*G06F 17/30* (2006.01)

(52) U.S. Cl. ............................... 726/26; 726/27; 726/3

(58) Field of Classification Search ........ 707/202–203, 707/219, 6–9; 380/201–203; 713/200–201, 713/1, 2, 168, 170; 709/200, 202, 203, 217, 709/219, 220, 222, 223–225, 228–229; 705/56–59, 705/67; 726/1–5, 14, 17–19, 21, 22–23, 726/27; 717/130–131
See application file for complete search history.

(56) References Cited

U.S. PATENT DOCUMENTS

| | | | | |
|---|---|---|---|---|
| 5,754,763 A * | 5/1998 | Bereiter | ...................... | 713/201 |
| 5,754,864 A * | 5/1998 | Hill | ............................ | 717/173 |
| 6,006,328 A * | 12/1999 | Drake | ........................ | 713/200 |
| 6,044,471 A * | 3/2000 | Colvin | ........................ | 713/202 |
| 6,067,582 A * | 5/2000 | Smith et al. | .................... | 710/5 |
| 6,138,155 A * | 10/2000 | Davis et al. | ................ | 709/224 |
| 6,173,283 B1 * | 1/2001 | Kasso et al. | ................... | 707/10 |
| 6,236,971 B1 * | 5/2001 | Stefik et al. | .................... | 705/1 |
| 6,243,468 B1 * | 6/2001 | Pearce et al. | ................ | 380/255 |
| 6,343,280 B1 * | 1/2002 | Clark | .......................... | 705/55 |
| 6,463,078 B1 * | 10/2002 | Engstrom et al. | ........... | 370/466 |
| 6,587,837 B1 * | 7/2003 | Spagna et al. | ................ | 705/26 |
| 6,609,114 B1 * | 8/2003 | Gressel et al. | ................ | 705/50 |
| 6,697,948 B1 * | 2/2004 | Rabin et al. | ................ | 713/200 |
| 6,725,260 B1 * | 4/2004 | Philyaw | ...................... | 709/220 |
| 6,742,030 B1 * | 5/2004 | MacPhail | ..................... | 709/224 |
| 6,799,277 B1 * | 9/2004 | Colvin | ........................ | 726/22 |
| 6,857,078 B1 * | 2/2005 | Colvin | ........................ | 726/22 |
| 6,910,072 B1 * | 6/2005 | Macleod Beck et al. | ... | 709/224 |

\* cited by examiner

*Primary Examiner*—Hosuk Song
*Assistant Examiner*—Leynna Ha
(74) *Attorney, Agent, or Firm*—Cahill, von Hellens & Glazer, P.L.C.

(57) ABSTRACT

A method and system for prevention of piracy of a given software application via a communications network, such as the Internet. A given software application, installed on a user system, will not function until it is activated by a remote service provider. This will require the user to provide the remote service provider with user data, such as the user's personal identity information and the unique software identification code relating to the specific software. User data will then be compared to archived data in order to determine if the user is a pirator of the software. If not a pirator, the remote service provider may transmit undisclosed service data, such as a software activation code, to the user system. Once activated, the software will become fully operational and allow the user complete access to its functions. In this manner, piracy of a given software application can be prevented.

40 Claims, 2 Drawing Sheets

METHOD AND SYSTEM FOR PREVENTION OF PIRACY OF A GIVEN SOFTWARE APPLICATION VIA A COMMUNICATIONS NETWORK

BACKGROUND OF THE INVENTION

The field of the invention generally relates to methods for preventing the piracy of software applications. The invention relates more particularly to a computer method and system for preventing the piracy of a given software application by elements of a communications network, such as the Internet. A given software application, installed on a user system, will only function after a remote service provider transmits a code sequence that will activate the software for use.

The creation of the personal computer has drastically simplified the ways in which people manage their business and personal affairs. One of the main reason why the computer has had such a great impact on our lives is due to the constant development of software applications which allow the computer to perform an array of different tasks and functions. As software applications advance, however, so to does their complexity and the programming skill needed to write and developing them. This has naturally caused many software applications to be quite expensive. Such high costs have often resulted in the free distribution of copied software that has not been paid for or licensed to the user. This type of piracy is especially common among friends, relatives, and business associates. Additionally, people also profit off piracy by producing illegal copies of a software application and distributing them in mass quantities for drastically reduced prices.

Due to the availability and low cost of sophisticated computer equipment such as the CD Write/Re-Write drive, software piracy has become a much greater concern over the current years. Today, virtually everyone can get access to such equipment and distribute CD based copies of software applications to whomever they please. Mass distribution of pirated software not only deprives the software manufacturer of their deserved earnings, but also allows other software pirators to pirate unlicensed copies of that application and propound the damage exponentially. As such, piracy has often resulted in inflated software prices and irreparable damage to software companies.

In efforts to combat the problems of software piracy, many software companies have enabled various preventative measures. Some of these include software access codes, activation plugs (i.e. memo hasp), registration, and even costly technical support services. Although somewhat effective, these measures have often been defeated with relative ease and little or no expense. For example, software access codes which must be entered to gain access to the software, are disclosed with the software package and are thus, easily copied and distributed to unlicensed users. Activation plugs, such as the ones which attach to the PC's parallel port, have also been easily duplicated by various manufacturers who illegally sell them on the black market. Furthermore, while registration of the software would inform the manufacturer of all users (licensed and unlicensed), pirators rarely do it given the absence of a compelling motivation to do so. Lastly, technical support groups are likewise, rarely used by pirators given their reluctance to disclose their illegal use of the software. As shown by these and other ineffective measures, it would be advantageous for a software manufacturer to control the functionality of a given software application in relation to each of its identified users.

BRIEF SUMMARY OF THE INVENTION

It is the object of the present invention to provide a reliable and effective method and system for preventing piracy of a given software application over a communications network, whereby the software application will not function unless activated by a remote service provider.

It is further the object of the present invention to provide a method and system for identifying each separate user of a given software application who installs and intends to effectively utilize the given software application.

It is further the object of the present invention to provide a method and system for associating user data to archived data accessible by the remote service provider, in order to determine if the user is a pirator of the software application.

The present invention is for a method and system for preventing piracy of individual software applications. A remote service system, controlled by a remote service provider, storably receives user data that is transmitted by a user of a given software application. Upon receiving the user data, the remote service system associates it to stored archive data which is accessible to the remote service provider. If it is determined that the user is not a pirator of the software, the remote service system will transmit service data which will activate the software and allow the user to utilize its full functionality. In this manner, the remote service provider can limit software piracy as only legitimate users of the software will be given the service data needed to activate the software.

DETAILED DESCRIPTION OF THE PREFERRED EMBODYMENTS

Figure 1:
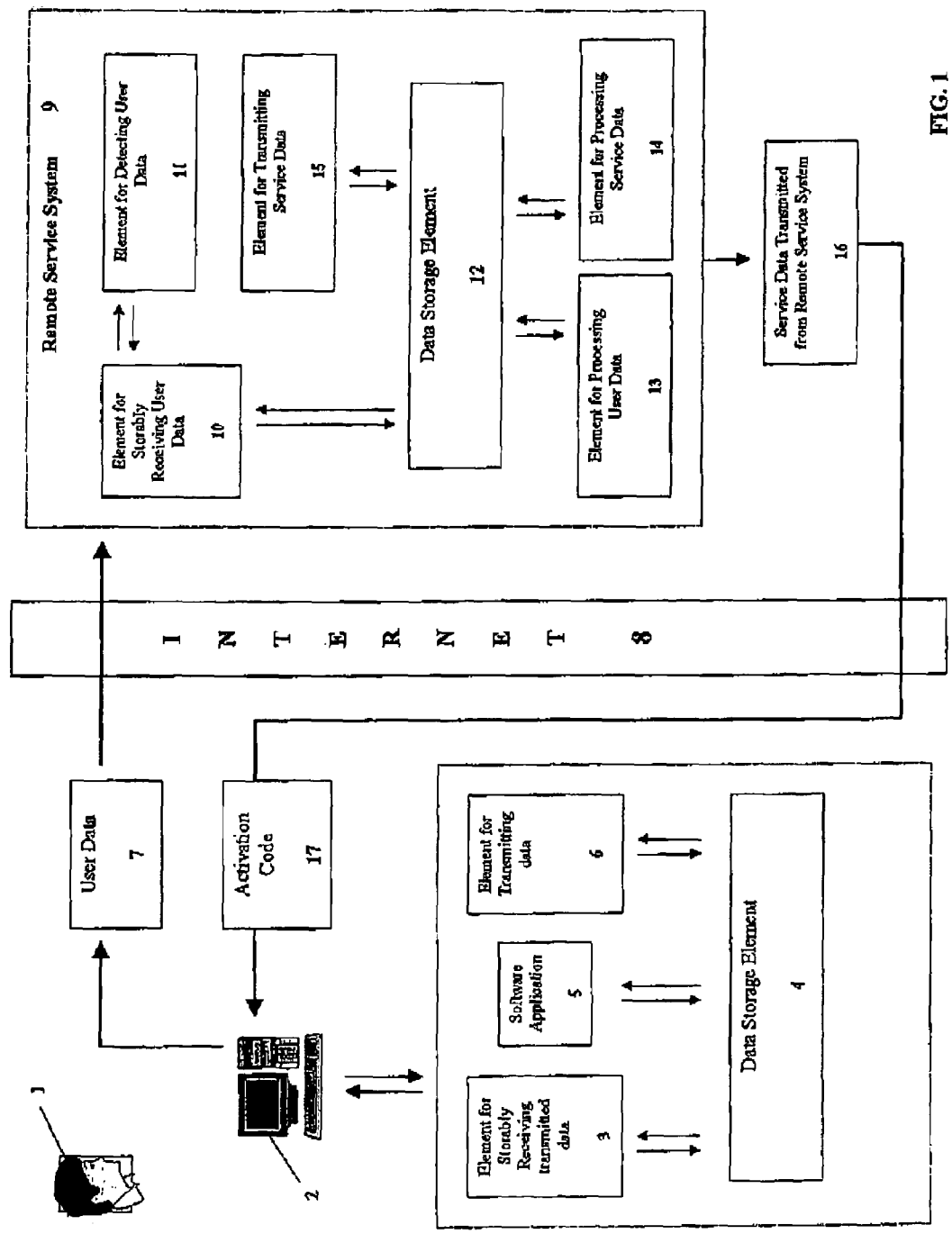
FIG. 1 is an overview diagram pictorially illustrating the flow of information that occurs between a user of a given software application and the remote service system in the method and system for prevention of software piracy according to the present invention.
Figure 2:
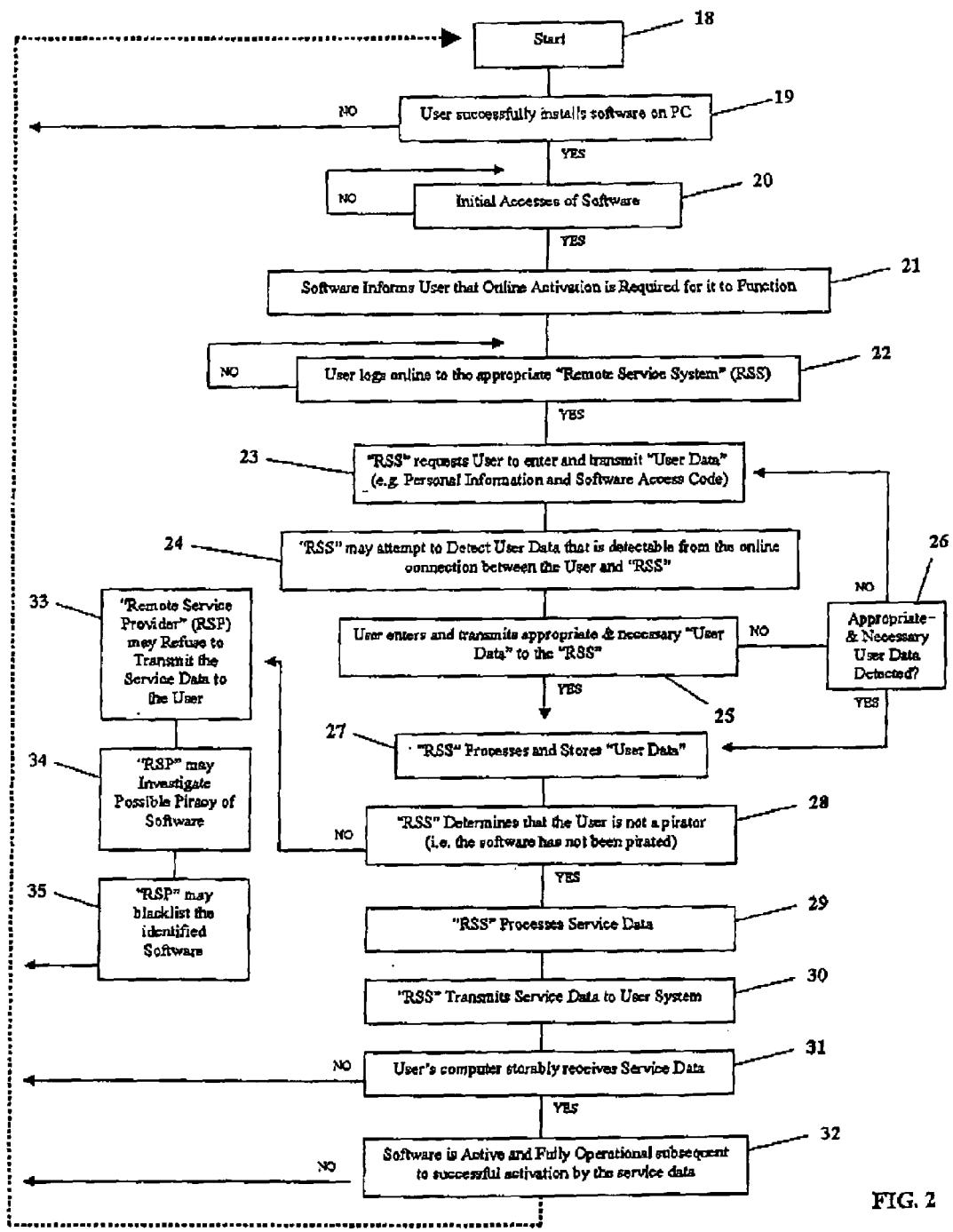
FIG. 2 is a block flowchart of the information flow that occurs in the method and system for prevention of software piracy according to the present invention.

In reference now to the drawings, FIGS. 1 and 2 show the information flow that occurs in a method and system (hereinafter "method"), indicated at reference character 100 in FIG. 1, for prevention of piracy of a given software application via a communications network, such as the Internet 8. Both FIGS. 1 and 2 illustrate the process by which a user would attempt to activate a given software application.

As shown in FIG. 1, the user 1 successfully installs a given software application 5 (hereinafter "software"), on the data storage element 4 of their user system 2. The user system 2 is generally defined as the user's computer terminal, which typically consists of a central processing unit (CPU) (not shown), data storage element 4, element for storably receiving transmitted data 3, element for transmitting data 6, and a monitor and keyboard. While the software 5 may utilize various anti-piracy measures, two, which will later be discussed in detail, are especially worth noting in relation to this invention. The first measure is a program code sequence that identifies the specific software 5 (hereinafter "identification code"), while the second is an additional program code sequence that would be needed to activate the software 5 (hereinafter "activation code"). It is preferred that transmission of both of these code sequences, between the user 1 and remote service system 9, would be accomplished over the Internet 8. As used in this invention, a user can be an individual entity or collaborate entity, such as a business, family, or even friends, who legitimately acquired a license and/or right to use the given software 5. Furthermore, the remote service system 9 can be the software manufacturer or an independent company, working in conjunction with the software manufacturer, which will operate to prevent software piracy as noted in this invention.

Upon an initial attempt to access the installed software 5, the user 1 will be informed that the software 5 will require online activation before it can be operational. Online activation will render the given software 5 operational, subject to receiving the activation code from the remote service system 9. This requires that the software 5 be designed wherein it is either partially or completely dysfunctional prior to receiving the activation code, as will be discussed below. By connecting to the remote service system 9 through the Internet 8, a user, who is not pirating the software 5, will be able to have the software 5 activated online. Although the Internet 8 is used exclusively when referencing a communications network, the present invention is intended to include all forms of communications network environments known to one skilled in the relevant art. Thus, method 100 is equally applicable to all interconnected computer systems capable of transmitting and receiving data, preferably digital data, which allow users of the network to communicate. In this regard, a communications network includes, but is not limited to, all telecommunications networks such as the Internet, i.e. the World Wide Web and BBS systems, hardwire telephony, wireless networks including cellular and PCS systems, satellite networks, etc. Furthermore, communications networks include localized and regional networks such as intranets and local area network (LAN) systems which interconnect a relatively few number of user systems or terminals, typically by means of a centralized server.

Once the user 1 establishes an online connection to the remote service provider 9, they will enter and transmit user data 7, by element for transmitting user data 6, to the remote service system 9 over the internet 8. The user data 7 would subsequently, be received by the remote service system 9 via element for storably receiving user data 10, and stored in the data storage element 12 of the remote service system 9. Although the transfer of user data 7 to the remote service system 9 would preferably be initiated by the user 1, this need not always be the case. Once the user 1 connects to the remote service system 9 via the Internet 8, the user data 7 may be automatically detected by element for detecting user data 11 of the remote service system 9. In this case, the detected user data 7 will likewise be received by the remote service system 9 via element for storably receiving user data 10, and subsequently stored by the data storage element 12 of the remote service system 9. It is notable that the term user data is defined and understood herein and in all the claims to mean any information originating from and/or available to the user of the software 5. This includes, but is not limited to personal identification information such as user name, address, location, phone number, etc. Additionally, user data 7 may consist of any information relating to the software 5 which identifies and distinguishes it from other "same type" or distinct software applications. This can include, but is not limited to information such as an "identification code" (as noted earlier), a product serial number, name, and/or version number.

It is worthy to mention that the software 5 should preferably contain an identification code, which is a program code sequence comprised of alphanumeric characters, that would serve to identify each individual software application. Given its function, the identification code may also be synonymous to a product's distinct serial number. Preferably, the identification code will be unique to each software application sold and disclosed to both the user 1 and remote service system 9. The advantage of a unique identification code is that it will allow the remote service system 9 to recognize and keep track of each software application sold. Although the identification code could consist of an elongated alphanumeric code sequence, such as a "program file(s)", it is preferred that it consist of a short code sequence of alphanumeric characters, e.g. XJR-U89K-RJ2P1. A short identification code sequence will allow the software 5 to be simply and easily identified. It should finally be noted that user data 7 may also refer to information identifying the user system 2 such as serial and model number as well as the type, function, and performance of the various system hardware components.

After receiving and storing the user data 7, the remote service system 9 will process the user data 7 via element for processing user data 13. Element for processing user data 13 may be, but is not limited to software, hardware device(s), or a combination of these two, which would allow for processing of the user data, as noted in this invention. Additionally, element for processing user data 13 may likewise include the remote service system's personnel staff who would be able to manually initiate processing of the user data, as noted in this invention.

Processing of the user data may include, but is not limited to an "archiving" event wherein a wide range of information that is received by or made available to the remote service system 9 is sorted, arranged, and organized into retrievable data files. Archived data stored in the data storage element 12 of the remote service system 9 may consist of, but is not limited to, a mass assortment of receivably stored user data (e.g. "identification codes"), service data (discussed below), and promotions, etc. Here, the archived data would relate to distinct users, various software applications, and potential advertisements; all of which may exist independently of one another. Second, archived data may also consist of information indicating the amount of user online activation attempts recorded for each identified software 5. Finally, archived data would include all other information that would be of use to the remote service system 9 in preventing piracy of a given software application, as noted in this invention.

Processing of the user data 7 may also consist of an "associating" event wherein the currently transmitted user data 7 is compared to archived data contained in the data storage element 12 of the remote service system 9. It is important to note that "associating" the currently transmitted user data 7 to archived data will allow the remote service system 9 to determine if the user 7 is attempting to activate a pirated version of the software 5. Here, the "product identification code" of software 5, along with other user data 7 currently being received from the user system 2, will be compared to existing archived data. If the archived data informs that the software 5 is legally registered to a completely distinct user, such may indicate that the user currently online is trying to activate a pirated version of the software 5. This result will occur if the archived data referencing the software 5 does not match the user data 7 currently being transmitted by the user system 2, and/or if the archived data indicates that there has been repeated and numerous attempts to activate the same software 5.

Multiple online activation attempts of the same software 5, regardless if such attempts are by distinct or the same users would naturally indicate that the software 5 was pirated and distributed to a multitude of different users. In this situation, the remote service provider may contact the registered user(s) to investigate into potential piracy. Additionally, the remote service system 9 may blacklist the specific software 5, as referenced by its identification code. Blacklisting of a given software application would mean that the identified software would be prohibited from receiving any future activation codes from the remote service system 9. For all intensive purposes, such an event would render the identified software void and permanently dysfunctional. This is because the software, as sold to the user, would need the activation code in order to function. Absent this code, the identified software would be inoperative and no longer subject to piracy.

When it is determined by the remote service system 9 that the user 2 is not a pirator of the software 5, service data, such as the activation code 17, may be transmitted to the user system 2. Here, the software 5 and/or the user system 2 would be responsive to the service data. As used in this invention, service data is defined and understood herein and in all the claims to mean any data that the remote service system 9 may legitimately transmit to the user system 2 during the online activation process for the software 5. Service data 16 may include, but is not limited to instructions, promotional messages, and an activation code(s). The instructions may guide the user 1 through the steps for activating the software 5, while a promotional message program code sequence may offer and display a particular product or service for sale. The activation code 17, as noted earlier, is a program code sequence that will serve to activate each individual software application, which absent the activation code 17, would be dysfunctional. The activation code may either be unique to each individual software 5 sold (hereinafter "unique activation code") or unique to a group of software (hereinafter "common activation code") that relate to a common software program, manufacturer, brand name, or version, etc. Of the two, the preferred embodiment would be the "unique activation code" which is unique to each individual software 5 sold.

One of the main advantages of using a unique activation code is the drastic curtailment of software piracy. Here, each software 5 will be designed wherein it is responsive to a distinct activation code. As such, an attempt to pirate distinct software applications would entail a tedious and time consuming task requiring the hacker to uncover the activation code of each individual software. Furthermore, a unique activation code will not allow for the activation of any "general" copy of the software which would otherwise be responsive to a common activation code. As an alternative to a unique activation code, a common activation code would activate all "same type" software applications. Developing "same type" software to be responsive to a common activation code may be advantageous given the potential for less confusion and troubleshooting errors which could arise during the software manufacturing and online activation stages.

It is noteworthy to mention that similar to the identification code, the activation code may likewise consist of either a long or short program code sequence. As noted earlier, a short code sequence would consist of a concise sequence of alphanumeric characters, e.g. HT3-GY2K-WR0P, while a long code sequence would consist of a small or large arrangement of alphanumeric data that result in a "program file(s)". Use of a long code sequence would be the preferred method of constructing the activation code. This is because a long code sequence (i.e. a program file) would be much harder to replicate then a short code sequence. Here, the software 5 may be developed wherein it is missing program files necessary for it to function. Only after these undisclosed program files (e.g. the activation code) are transmitted from the remote service system 9 to the user system 2, will the software 5 be functional.

An activated software application will be fully operational and allow the user complete access to it. Although it need not be so, it is preferred that the activation code 17 remain undisclosed to the user 2. Here, the need for the activation code will compel the user 2 to register the software 5 online with the remote service system 9. Furthermore, and more importantly, having the activation code 17 only known to the remote service provider and its business affiliates (such as the software manufacturer) will prevent piracy of the software 5. This is because users who wish to pirate the software 5 will not be able to replicate the activation code and distribute it along with a medium (e.g. CD Rom) containing a copy of the software 5. Given this, it is additionally preferred that the activation code 17 be designed wherein it is immune to discovery by computer hackers and sophisticated programmers. The objective here is to prevent these individuals from "breaking in" to the software 5 and either re-writing or discovering the undisclosed activation code. As noted earlier, this may require constructing the activation code as a long code sequence which results in a program file(s). Additionally, other measures may include code encryption as well as any other programming methods known to those skilled in the relevant technical art.

Before a software 5 can be activated, the appropriate service data must be processed and transmitted to the user system 2. Processing of the service data 16 would require that it be either extracted or generated from the archived data stored on the data storage element 12 of the remote service system 9. Extraction or generation of the service data 16 will be accomplished by element for processing service data 14, as referenced in Method 100 of FIG. 1. Element for processing service data 14 may be, but is not limited to software, hardware device(s), or a combination of the two, which would allow for processing of the service data, as noted in this invention. Additionally, element for processing service data 16 may likewise include the remote service system's personnel staff who would be able to manually initiate processing of the service data 16, as noted in this invention.

Extraction of service data 16 from the archived data entails a selection process wherein only the appropriate and necessary service data is singled out from the total archived data and made available for transmission to the user system 2. Extraction of the service data is necessary given the multitude of distinct service data information that may be stored and archived by the remote service system 9. For example, the activation code "ABC-123", contained in the archived data, would only be extracted when a user 1 who possesses the specific software referencing the identification code "ABC-123" attempts to activate it online. Stated differently, service data containing an activation code relating to Microsoft Word 2000 would not be extracted for a user trying to activate a Norton Anti-virus software application. The reason for this is that different users will require different service data, depending on the requirements of the specific software that they are attempting to activate.

Alternatively, the second embodiment for processing the service data 16 pertains to an event which causes the service data 16 to be generated. This event entails a process wherein pre-existing archive data may be formulated into the appropriate service data upon request from the remote service system 9. Generation of service data can be advantageous as this method will permit the remote service system 9 to manipulate various data components, existing in the archived data, in order to formulate the service data 16. For example, the remote service system 9 may combine personal identification information belonging to the user 1 with promotional data to formulate a personalized advertisement directed at the user 1. Additionally, the remote service system 9 could combine user data (such as the directory file location of the user system 2 that contains the installed software 5) with the appropriate activation code, to formulate a self executing program file which, upon an access event, would automatically install the service data 16 into the correct file location of the user system 2. Here, formulation of the service data may include, but is not limited to a series of calculations, combinations, and/or sorting out of the appropriate archived data. Generation of the service data may occur at any time prior to or after the remote service system 9 determines that the user 1 is not a pirator of software 5 and is eligible to receive the service data 16.

Once the service data 16 is extracted or generated via element for processing service data 14, the remote service system 9 will transmit it to the user system 2. Transmission of the service data 16 may be accomplished in a number of ways. The first two methods involve an event wherein the service data 16 is uploaded into the user system 2, while the third method requires the user 1 to download the service data 16 into their user system 2. In the first embodiment for uploading the service data 16, the remote service system 9 initiates an uploading event in which the service data is automatically transferred from the remote service system 9 to the user system 2 wherein it is storably received via element for storably receiving 3 service data 16. In doing this, the remote service system 9 may find it necessary to determine the appropriate file directory location of the user system 2 in which to upload the service data. Determination of this location may be accomplished by, but is not limited to user 1 disclosure, as transmitted by the user (e.g. user data), or via an interactive search of the file directory of user system 2.

In the second embodiment for uploading of the service data 16, the remote service system manually transmits the service data 16 to the user system 2. Manual transmission of the service data 16 would allow remote service system personnel to decide when the transfer sequence should be initiated. Furthermore, manual transmission would enable such personnel to manually enter and transmit needed service data 16 which may not have been processed by the element for processing service data 14 of the remote service system 9. Finally, in the third method for transmitting, the service data 16 may be made available to the user 1 for them to download into their user system 2. Here, the remote service system 9 generates the archived data 16 into a file that can be downloaded by the user 1. The file would contain service data and possibly some elements of user data. It is preferred (as discussed earlier) that the file contain a self-executing installation program that is triggered upon an access event by the user. For example, as a result of successful downloading and accessing of the file, the service data 16 will automatically be installed into the appropriate file directory of the user system 2.

Following successful upload or installation of the service data 16 (such as the activation code 17) into the user system 2, the software 5 will gain full functionality. Complete activation of the software 5 will allow the user 1 to freely utilize it to its full potential. Preferably, the user 1 will never need to go through the online activation process (as mentioned herein) again unless they attempt to install the software 5 on another user system or re-install it on their current user system 2.

Although many different scenarios can arise during the online activation process of a given software 5, FIG. 2 illustrates, in block diagram form, one possible "real time" cycle run of the present invention. Starting from block 18, the user 1 successfully installs a given software application on their user system 2, at block 19. Upon an initial access event of the software 5, as shown at block 20, the software 5, at block 21, will inform the user 1 that online activation is required in order for it to function. If the user 1 decides to register the software 5, they must connect online to the appropriate remote service system 9, as shown at block 22. At this point, the remote service system 9 may request from the user 1 that they enter and transmit user data 7 to the remote service system 9, block 23. In addition to this, the remote service system 9 may also attempt to detect any user data 7 that can be detected by virtue of the online connection between the user system 2 and remote service system 9, block 24. If the appropriate and necessary user data 7 is entered and transmitted by the user 1, block 25, or detected by the remote service system 9, block 26, then it will be stored and processed by the remotes service system 9 as indicated at block 27. It should be noted that where the user 1 fails to provide and transmit the appropriate and necessary user data 7, and/or the remote service system 9 is unable to detect the appropriate and necessary user data 7, the cycle will repeat and be taken back to block 23.

The processing of the user data 7 will allow the remote service system 9 to determine if the user is a pirator of the software 5. If the remote service system 9 determines that the user 1 is not a pirator, at block 28, service data 16 will be processed, block 29. At this point, the remote service system 9 will transmit the service data 16 to the user system 2, at block 30. Transmission may be accomplished via uploading or downloading methods as described earlier. After the service data 16 is storably received by the user system 2, block 31, the software 5 will be active and fully operational subject to successful activation by the service data 16, block 32. In the event that the service data 16 was not properly received by the user system 2, or effective in activating the software 5, the cycle will repeat, starting from block 18.

Finally, it is noteworthy to mention that in the event that the remote service provider determines that the user 1 is pirating the software 5, it may refuse to transmit the service data 16, as shown by block 33. Additionally, it may investigate into the possibility of piracy, at block 34, as well as blacklist the identified software 5, at block 35.

The program code sequence and all other technical aspects required by this invention are all conventional and known to those skilled in the art and need not be described in detail herein. Furthermore, the term "element", as stated in the specification and all the claims herein, may be construed in the plural tense as would be necessary in regards to each noted reference made.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

I claim:

1. A method of preventing piracy of a given software application comprising the steps of:
    assigning a unique identification code to each authentic copy of such software application;
    installing the software application in a data storage element on a user's computer;
    configuring the software application to require service data to activate at least part of its functionality;
    requiring the user to communicate user data over a communications network to a remote service provider, the user data being derived, at least in part, from the unique identification code;
    examining received user data to derive the unique identification code associated with the copy of the software application installed by said user
    counting the number of times an attempt has been made to obtain said service data in order to activate at least part of the functionality of said software application assigned to such unique identification code; and
    selectively transmitting service data to the user's computer when said remote service provider determines that the number of times an attempt has been made to obtain said service data in order to activate at least part of the functionality of said software application assigned to such unique identification code is fewer than a predetermined threshold, said user's computer being connected to said communications network and designated to storably receive said service data.

2. The method as in claim 1,
    wherein said user data comprises the unique identification code that identifies said software application installed on a data storage element of the user's computer.

3. The method as in claim 1,
    wherein said user data includes identifying data that identifies the user.

4. The method as in claim 1,
    wherein said user data includes product information relating to said software application installed on the data storage element of the user's computer.

5. The method as in claim 1,
    wherein said service data is maintained in the data storage element of the remote service provider.

6. The method as in claim 5,
    wherein said service data comprises at least one program code sequence that activates at least part of the functionality of said software application stored on said data storage element of the user's computer.

7. The method as in claim 5,
    wherein said service data includes at least one program code sequence that results in a promotional message that may be displayed to said user on the user's computer system.

8. The method as in claim 1,
    wherein said service data is derived at least in part from said user data stored on said data storage element of said remote service provider.

9. The method as in claim 1,
    wherein the step of selectively transmitting said service data is an uploading event in which said service data is automatically transferred from said remote service provider and storably received by the user's computer system.

10. The method as in claim 1,
    wherein the step of selectively transmitting said service data is an uploading event in which said service data is manually transferred from said remote service provider and storably received by the user's computer system.

11. The method as in claim 1,
    wherein the step of selectively transmitting said service data is a downloading event in which said service data is made available to said user from said remote service provider, and wherein said user downloads said service data into the user's computer system.

12. The method as in claim 1,
    wherein said software application includes a program code sequence that identifies said software application stored on said data storage element of the user's computer system, said software application additionally being responsive to a second program code sequence that activates at least part of the functionality of said software application, and which is transmitted to the user's computer system via said communications network.

13. The method as in claim 1 further comprising the steps of:
    requiring a user to provide identifying data that identifies the user;
    deriving the user data that is communicated to the remote service provider, at least in part, from the identifying data that identifies the user;
    archiving received identifying data in a data storage element of the remote service provider for each unique identification code; and
    comparing the received identifying data for a given unique identification code with previously archived identifying data for the same unique identification code to determine whether they match each other.

14. The method as in claim 13 including the step of restricting transmission of said service data to the user's computer if said received identifying data for a given unique identification code does not match previously archived identifying data for the same unique identification code.

15. A system for preventing piracy of a given software application, said software application having a unique identification code associated therewith, and said software application requiring service data to activate at least part of the functionality of said software application, said system comprising:
    a user computer system on which a user desires to operate the software application, said user system being connected to a communications network to transmit user data and to receive said service data, said user data being derived at least in part from said unique identification code;
    a remote service computer system connected to said communications network to receive user data transmitted over the communications network from the user computer system said remote service computer system transmitting said service data to said user computer system when the number of times an attempt has been made to obtain said service data in order to activate at least part of the functionality of said software application assigned to such unique identification code is fewer than a predetermined threshold.

16. The system as in claim 15
    wherein said remote service computer system includes a data storage element for archiving user data for each unique identification code, wherein said remote service computer system compares user data received from the user computer system to user data previously archived by said remote service computer system relative to the same unique identification code, and wherein said remote service computer system transmits said service data to said user computer system when said user data received by said remote service computer system is consistent with user data previously archived by said remote service computer system relative to the same unique identification code.

17. The system as in claim 15 wherein said service data is maintained by said remote service computer system in the data storage element used to archive said service data.

18. The system as in claim 15 wherein said service data consists, at least in part, of an activation code sequence to activate at least part of the functionality of the software application.

19. The system as recited in claim 18, wherein said service data includes at least one program code sequence that results in a promotional message that may be displayed to said user on said user computer system.

20. The system as in claim 15 wherein said service data is transferred by said remote service computer system without human intervention and received by said user computer system.

21. The system as in claim 15 wherein said remote service computer system manually transfers said service data from said remote service computer system to said user system.

22. The system as in claim 15 wherein said remote service computer system makes said service data available to said user from said remote service system, said user being able to download said service data into said user computer system.

23. The system as in claim 15, wherein said software application includes a program code sequence that identifies said software application stored on said data storage element of said user system, said software application additionally being responsive to a second program code sequence that activates at least part of the functionality of said software application, and which is transmitted to said user system via a communications network.

24. A method of preventing piracy of a given software application comprising the steps of:
assigning a unique identification code to each authentic copy of such software application;
installing the software application in a data storage element on a user's computer;
configuring the software application to require service data to activate at least part of its functionality;
requiring the user to communicate user data over a communications network to a remote service provider, the user data being derived, at least in part, from the unique identification code;
examining received user data to derive the unique identification code associated with said software application;
determining the number of times an attempt has been made to obtain said service data in order to activate at least part of the functionality of said software application assigned to such unique identification code;
selectively transmitting service data to the user's computer when the number of times an attempt has been made to obtain said service data is fewer than a predetermined threshold; and
receiving the transmitted service data within the user's computer, wherein said service data is used to activate at least part of the functionality of the software application.

25. The method recited by claim 24 further including the step of archiving user data received from users over the communications network in a data storage element of the remote service system.

26. The method recited by claim 25, wherein received user data for each unique identification code is compared with previously archived user data corresponding to the same unique identification code.

27. The method recited by claim 24 wherein said received service data is stored within the data storage element of the user's computer.

28. The method as in claim 24 further comprising the steps of:
requiring a user to provide identifying data that identifies the user;
deriving the user data that is communicated to the remote service provider, at least in part, from the identifying data that identifies the user;
archiving received identifying data in a data storage element of the remote service provider for each unique identification code; and
comparing the received identifying data for a given unique identification code with previously archived identifying data for the same unique identification code to determine whether they match each other.

29. The method as in claim 28 including the step of restricting transmission of said service data to the user's computer if said received identifying data for a given unique identification code does not match previously archived identifying data for the same unique identification code.

30. A method of preventing piracy of a given software application comprising the steps of:
a. assigning a unique identification code to each authentic copy of such software application;
b. installing the software application in a data storage element on a user's computer;
c. configuring the software application to require service data, said service data being a necessary component to enable at least part of the software's functionality;
d. requiring the user to communicate user data to a remote service provided, the user data being derived, at least in part, from the unique identification code;
e. examining received user data to derive the unique identification code associated with said software application;
f. determining the number of times an attempt has been made to obtain said service data in order to activate at least part of the functionality of said software application assigned to such unique identification code;
g. selectively transmitting service data to the user's computer when the number of times an attempt has been made to obtain said service data in order to activate the software application assigned to such unique identification code is fewer than a predetermined threshold; and
h. receiving the transmitted service data within the user's computer, wherein said service data is used to activate at least part of the functionality of the software.

31. The method recited by claim 30 further including the step of archiving user data received from users.

32. The method recited by claim 31, wherein received user data for each unique identification code is compared with previously archived user data corresponding to the same unique identification code.

33. The method recited by claim 30, wherein said received service data is stored within the data storage element of the user's computer.

34. The method as in claim 30 further comprising the steps of:
- requiring a user to provide identifying data that identifies the user;
- deriving the user data that is communicated to the remote service provider, at least in part, from the identifying data that identifies the user;
- archiving received identifying data in a data storage element of the remote service provider for each unique identification code; and
- comparing the received identifying data for a given unique identification code with previously archived identifying data for the same unique identification code to determine whether they match each other.

35. The method as in claim 34 including the step of restricting transmission of said service data to the user's computer if said received identifying data for a given unique identification code does not match previously archived identifying data for the same unique identification code.

36. A method of preventing piracy of a given software application comprising the steps of:
   a. assigning a unique identification code to each authentic copy of such software application;
   b. installing the software application in a data storage element on a user's computer;
   c. configuring the software application to require service data, said service data being a necessary component to enable at least part of the software's functionality;
   d. requiring the user to communicate user data to a service provider, the user data being derived, at least in part, from the unique identification code;
   e. examining received user data to derive the unique identification code associated with said software application;
   f. ascertaining the number of times an attempt has been made to obtain said service data in order to activate at least part of the functionality of said software application assigned to such unique identification code; and
   g. determining whether the number of times an attempt has been made to obtain said service data is fewer than a predetermined threshold.

37. The method recited by claim 36 further including the step of archiving user data received from users.

38. The method recited by claim 37, wherein received user data for each unique identification code is compared with previously archived user data corresponding to the same unique identification code.

39. The method recited by claim 36 further including the step of communicating service data to the user to activate at least part of the said software's functionality.

40. The method recited by claim 39, wherein said communicated service data is stored within the data storage element of the user's computer.

* * * * *